United States Patent Office 3,790,496
Patented Feb. 5, 1974

3,790,496
ALKYLENE POLYAMINE POLYMERIC REACTION PRODUCT CORROSION INHIBITOR
Rudolf H. Hausler, Arlington Heights, Ill., assignor to Universal Oil Products Company, Des Plaines, Ill.
No Drawing. Filed Sept. 30, 1971, Ser. No. 185,451
Int. Cl. C23f 11/14
U.S. Cl. 252—392   12 Claims

ABSTRACT OF THE DISCLOSURE

A corrosion inhibiting composition of (1) a hydrocarbon substituted alkylene polyamine and (2) polymeric reaction product of an epihalohydrin compound and an aliphatic amine. The composition is incorporated in any substrate which contacts metal and thereby serves to inhibit corrosion of the metal.

BACKGROUND OF THE INVENTION

It is well known that metal surfaces undergo corrosion upon contact with organic substances containing corrosive ingredients. For example, in the manufacture, handling, transportation, storage and/or use of hydrocarbon gases or liquids, corrosion of metallic equipment, occurs due to the presence of one or more of oxygen, hydrogen sulfide, carbon dioxide, carboxylic acids, hydrogen halides, halogen salts of sodium chloride, ammonium chloride, etc., or mixtures thereof, as well as the presence of water in solution or in suspension in the organic substance. Illustrative petroleum substances include gasoline, naphtha, kerosine, jet fuel, diesel fuel, fuel oil, lubricating oil, crude oil, etc., as well as normally gaseous hydrocarbons.

Some of the petroleum products are prepared as special products for particular uses and the corrosion problem is especially critical. For example, particular oil fractions are used as lubricants or solvents in the manufacture and/or use of sophisticated timing or controlling mechanism. Also of particular concern is refinery plant equipment, including reactors, fractionators, receivers, heat exchangers, pumps, piping, etc., where the petroleum charge is subjected to high temperature and the reaction products are subjected to cooling and condensation. Other organic substances may include alcohols, ketones, esters, ethers, dioxane, etc., as well as normally solid products such as grease. It is understood that the organic substances may be of mineral, animal or vegetable origin.

Because of the seriousness of the corrosion problems, considerable effort has been expended to discover agents which will inhibit the corrosion. The prior art is replete with numerous suggested compounds and mixtures. Among many others, the prior art includes the use of particularly substituted alkylene polyamines as described in R. B. Thompson U.S. Pat. 3,114,702.

DESCRIPTION OF THE INVENTION

While the substituted alkylene polyamines disclosed in Pat. 3,114,702 are effective corrosion inhibitors, it is desirable to further improve the corrosion inhibition potency, particularly for use at low concentrations.

The present invention is directed to a novel corrosion inhibitor composition of a substituted alkylene polyamine and a polymeric reaction product of an epihalohydrin compound and aliphatic amine. The polymeric reaction product by itself in low concentrations is of substantially no effect as a corrosion inhibitor, but in admixture with the substituted alkylene polyamine provides a novel composition of improved corrosion inhibition effectiveness. While the present applicant does not wish to be limited thereto, it is believed that, through a mutually related and interdependent coaction, contact of the active inhibitor compounds with the metal surface is improved. For example, it is believed that the polymeric reaction product serves to extract the substituted alkylene polyamine out of the hydrocarbon phase and into contact with the metal surface.

In one embodiment the present invention relates to a corrosion inhibiting composition of (1) from about 50% to about 98% by weight of an alkylene polyamine having a hydrocarbyl group of at least 4 carbon atoms attached to at least one of the nitrogen atoms and (2) from about 2% to about 50% by weight of a polymeric reaction product of an epihalohydrin compound and a 10–30 carbon atom aliphatic amine.

As hereinbefore set forth, one component of the inhibitor composition is a substituted alkylene polyamine. The substituted alkylene polyamine is of the following general formula:

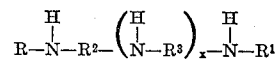

where R and $R^1$ are hydrogen, alkyl of at least 3 carbon atoms or cycloalkyl of at least 3 carbon atoms, at least one of R and $R^1$ being alkyl or cycloalkyl, $R^2$ and $R^3$ are alkylene of 2 to 4 carbon atoms and $x$ is an integer of 0 to 3.

In a particularly preferred embodiment, R and $R^1$ are secondary alkyl groups. These substituted alkylene polyamines are readily prepared by the reductive alkylation of the alkylene polyamine with a ketone. Numerous specific compounds and details of the reductive alkylation process are described in Pat. 3,114,702 and are incorporated herein by reference thereto. The alkyl group or groups will each contain from 3 to about 40 carbon atoms and preferably from about 6 to about 20 carbon atoms. Particularly preferred compounds in this embodiment include $N^1,N^3$-di-(1-ethyl-3-methylpentyl)-diethylene triamine,
N,N'-di-(1-ethyl-3-methylpentyl)-ethylene diamine,
$N^1,N^4$-di-(1-ethyl-3-methylpentyl)-triethylene tetramine,
$N^1,N^5$-di-(1-ethyl-3-methylpentyl)-tetraethylene pentamine,
N,N'-di-(1-methylheptyl)-ethylene diamine,
$N^1,N^3$-di-(1-methylheptyl)-diethylene triamine, and corresponding compounds in which the alkyl substituents contain from 6 to 20 carbon atoms.

In another embodiment, at least one of R and $R^1$ in the above formula is cycloalkyl containing at least carbon atoms and up to 12 or more carbon atoms in the ring. In a preferred embodiment the cycloalkyl group will contain from 6 to 8 carbon atoms in the ring and thus will comprise cyclohexyl, cycloheptyl and cyclooctyl, with the understanding that the cycloalkyl ring may be substituted with one or more, preferably 1 to 3, alkyl groups of from 1 to 12 carbon atoms each. Illustrative compounds in this embodiment include N-cyclohexyl-ethylene diamine,
N-cyclohexyl-N'-$C_3$-$C_{20}$-alkyl-ethylene diamine,
N-cyclohexyl-diethylene triamine,
$N^1,N^3$-dicyclohexyl-diethylene triamine,
$N^1$-cyclohexyl-$N^3$-$C_3$-$C_{20}$-alkyl-diethylene triamine,
N-cyclohexyl-triethylene tetramine,
$N^1,N^4$-dicyclohexyl-triethylene tetramine,
N-cyclohexyl-$N^4$-$C_3$-$C_{20}$-alkyl-triethylene tetramine, etc., with the understanding that the cyclohexyl group may be replaced by other cycloalkyl groups and the ethylene moiety may comprise propylene or butylene.

It is understood that the different substituted alkylene polyamines are not necessarily equivalent for use in a particular organic substance and that the specific substituted alkylene polyamine will be selected with reference to its compatability and coaction with the polymeric condensation product.

Another component of the inhibitor composition is a polymeric reaction product of a epihalohydrin compound and an amine. Any suitable amine may be used and preferably comprises an aliphatic amine containing 10 to 30 and still more particularly from 12 to 24 carbon atoms per molecule. The amine may be a primary aliphatic amine and thus will be selected from decyl amine, undecyl amine, dodecyl amine, tridecyl amine, tetradecyl amine, pentadecyl amine, hexadecyl amine, heptadecyl amine, octadecyl amine, nonadecyl amine, eicosyl amine, heneicosyl amine, docosyl amine, tricosyl amine, tetracosyl amine, pentacosyl amine, hexacosyl amine, heptacosyl amine, octacosyl amine, nonacosyl amine, triacontyl amine, as well as the corresponding alkenyl amines. Conveniently these long chain amines are prepared from fatty acids, the amines being referred to herein as fatty amines, and thus include lauryl amine, myristyl amine, palymityl amine, stearyl amine, arachidyl amine, palmitoleyl amine, oleyl amine, ricinoleyl amine, linoleyl amine, linolenyl amine, etc.

Mixtures of fatty amines are available commercially under various trade names including "Alamine H26D," "Armeen HTD," etc. These products comprise mixtures predominating in alkyl amines containing 16 to 18 carbon atoms per alkyl group, although they contain a small amount of alkyl groups having 14 carbon atoms. Other mixed fatty amines include tallow amine, coco amine, palm amine, soya amine, etc., as well as hydrogenated products thereof. Other mixed fatty amines may contain from 10 to 24 carbon atoms.

In another embodiment the amine is an N-aliphatic-diaminoalkane having an aliphatic group of at least 8 and preferably of at least 10 carbon atoms and may contain up to 30 or more carbon atoms. A particularly preferred N-alkyl-diaminoalkane is an N-alkyl-1,3-diaminopropane including for example, N-decyl-1,3-diaminopropane,
N-undecyl-1,3-diaminopropane,
N-dodecyl-1,3-diaminopropane,
N-tridecyl-1,3-diaminopropane,
N-tetradecyl-1,3-diaminopropane,
N-pentadecyl-1,3-diaminopropane,
N-hexadecyl-1,3-diaminopropane,
N-heptadecyl-1,3-diaminopropane,
N-octadecyl-1,3-diaminopropane,
N-nonadecyl-1,3-diaminopropane,
N-eicosyl-1,3-diaminopropane,
N-heneicosyl-1,3-diaminopropane,
N-docosyl-1,3-diaminopropane,
N-tricosyl-1,3-diaminopropane,
N-tetracosyl-1,3-diaminopropane,
N-pentacosyl-1,3-diaminopropane,
N-hexacosyl-1,3-diaminopropane,
N-heptacosyl-1,3-diaminopropane, etc.

Here again the aliphatic group conveniently is derived from fatty acid and thus the aliphatic group may be lauryl, myristyl, palmityl, stearyl, arachidyl, palmitoleyl, oleyl, ricinoleyl, linoleyl, linolenyl, etc. A number of N-alkyl-1,3-diaminopropanes are available commercially as mixtures and generally at lower cost. One such mixture is available commercially under the trade name of "Duomeen T" in which the alkyl substituents contain from about 12 to about 20 carbon atoms per group and mostly 16 to 18 carbon atoms. Another mixture is available as "Diam 26." Still another commercially available mixture is "Duomeen O" and comprises N-oleyl-1,3-diaminopropane. Another N-aliphatic-1,3-diaminopropane is "Duomeen LPS" in which the aliphatic group is derived from phenyl stearic acid. This is a mixed acid in which the phenyl group is positioned on either the 9 or 10 carbon atoms of the stearyl chain.

A preferred epihalohydrin compound is epichlorohydrin. Other epichlorohydrin compounds include 1,2-epi-4-chlorobutane, 2,3-epi-4-chlorobutane, 1,2 - epi-5-chloropentane, 2,3-epi-5-chloropentane, etc. While the chloro derivatives are preferred, it is understood that the corresponding bromo and iodo compounds may be employed. In some cases epihalohydrin compounds may be used. It is understood that the different epihalohydrin compounds are not necessarily equivalent and that, as hereinbefore set forth, epichlorohydrin is preferred.

The reaction of amine and epichlorohydrin is effected in any suitable manner. Preferably the reactants are prepared as solutions in suitable solvents, including aromatic hydrocarbons, paraffin hydrocarbons, alochols such as ethanol, propanol, butanol, etc., or mixtures thereof. Conveniently the reaction is effected by heating the epichlorohydrin solution at reflux conditions with stirring, gradually adding the amine thereto and continuing the heating, preferably at a higher temperature, until the reaction is completed, or the reverse order of adding the reactants may be used. In general the temperature will range from about 65° to about 215° F. and preferably from about 120° to about 215° F. The time of reaction will be sufficient to effect polymer formation and generally will range from about 2 and preferably from about 4 to 24 hours or more. The organic halide salt, which is formed initially, is converted to an inorganic halide salt, thereby liberating the free amine for further reaction to form the polymeric product. This may be effected in any suitable manner and may be accomplished by reacting the primary reaction product with a strong inorganic base, such as sodium hydroxide, potassium hydroxide, etc., to form the corresponding metal halide. The reaction to form the metal halide is effected at a temperature within the range of from about 130° to about 215° F. and preferably from about 165° to about 195° F. The inorganic base preferably is added in at least two steps with intervening heating and reacting in order to insure liberation of the free amine.

Also it generally is preferred to further heat and react the mixture at a temperature of from about 165° to about 195° F. to insure formation of the desired polymer. The polymeric reaction product may contain from 2 to 20 or more and preferably 3 to 10 recurring units. After formation of the desired polymeric reaction product or prior thereto if desired, the inorganic halide salt is removed in any suitable manner including filtering, centrifugal separation, etc. In some cases it may be of advantage to effect the filtering at an elevated temperature, which may be within the range of from about 95° to about 160° F. Detailed information on the preparation of some of these reaction products is contained in U.S. Pat. 3,189,652 and such details are incorporated by reference into the present specifications.

It is understood that the substituted alkylene polyamine and/or the polymeric reaction product may be utilized as such or may be formed as a solution in a suitable solvent for ease of handling and mixing. Any suitable solvent may be used and may be selected from hydrocarbons including aromatic hydrocarbons as benzene, toluene, xylene, cumene, etc., or paraffin hydrocarbon as pentane, hexane, heptane, octane, nonane, decane, etc., as well as mixtures thereof such as naphtha, kerosine, etc.

The alkylene polyamine and the polymeric reaction product are used in a proportion of from about 50% to about 98% by weight of the alkylene polyamine and from about 2% to about 50% by weight of the polymeric reaction product. In a particularly preferred embodiment the alkylene polyamine is in a proportion of from about 90% to about 98% by weight and the polymeric reaction product is in a concentration of from about 2% to about 10% by weight. These percents are on the basis of active ingredients and do not include solvents or other components incorporated in the inhibitor composition.

While the alkylene polyamine and the polymeric reaction product may be added separately in the prescribed proportions to the organic substrate, it is preferred to form a blend of these ingredients and to incorporate the blend into the organic substrate. When desired, the inhibitor composition may also contain one or more other ingredients as, for example, a metal deactivator, such as disalicylal diaminopropane, ethylenediamine tetra-acetic acid, etc., antioxidants which generally are of the phenolic or amine type, or other additives which normally are incorporated in the substrate. For ease in handling, the final inhibitor composition preferably is prepared as a solution in a suitable solvent, the solvent preferably being selected from those hereinbefore set forth, and conveniently comprises all or a part of the solvent or solvents originally contained in the alkylene polyamine and polymeric reaction product.

It is an important advantage of the present invention that the inhibitor composition is utilized in a comparatively low concentration, which will be lower than otherwise required. The concentration of the inhibitor composition, based on active ingredients, may be within the range of from 1 to 50 p.p.m. (parts per million) of the substrate, although higher concentrations up to 1000 p.p.m. may be employed in special situations encountering excessive corrosion.

As hereinbefore set forth the inhibitor composition of the present invention is used in any substrate which contacts metal and in which corrosion of the metal is encountered. In one embodiment the inhibitor composition is incorporated in a hydrocarbon substrate and will be added to the substrate in the desired concentration, preferably accompanied by some form of mixing in order to obtain uniform distribution of the inhibitor composition, such as for example by the use of a mixing device, pumping of the mixture, recirculation out of and back into a vessel, or in any other suitable manner.

In another embodiment the inhibitor composition is incorporated into a fractionation zone and/or into the overhead vapor line, side stream being withdrawn from the fractionation zone, or other product streams. In still another embodiment the inhibitor composition may be used to prevent corrosion of oil wells and will be introduced thereto in conventional manner.

The following examples are introduced to illustrate further the novelty and utility of the present invention but not with the intention of unduly limiting the same.

EXAMPLE I

The inhibitor composition of this example is a mixture of 95% by weight of $N^1$-$N^3$-di-(1-ethyl-3-methylpentyl)-diethylene triamine and 5% by weight of the polymeric reaction product of "Duomeen T" and epichlorohydrin, exclusive of solvents.

The $N^1$-$N^3$-di-(1-ethyl-3-methylpentyl)-diethylene triamine is prepared by the reductive alkylation of diethylene triamine with ethyl amyl ketone. The reductive alkylation is effected in two steps. As a typical laboratory preparation, 70 grams (0.68 mole) of diethylene triamine and 268 grams (2.09 moles) of ethyl amyl ketone are heated to boiling under refluxing conditions until about 26 ml. of water are collected. The mixture then is further reacted at a temperature of about 320° F. and a maximum hydrogen pressure of about 1900 p.s.i.g. in contact with a reduced platinum catalyst comprising alumina composited with 0.3% by weight of platinum. The reductive alkylation product is distilled at about 2 mm. pressure to recover $N^1$-$N^3$-di-(1-ethyl-3-methylpentyl)diethylene triamine as a fluid brown liquid, having a boiling point of 284–338° F.

The polymeric reaction product is prepared by the reaction of "Duomeen T" with epichlorohydrin. The reactants are used in substantially equal mole proportions. A solution of epichlorohydrin in alcohol and xylene is charged to a reaction zone and then the desired amount of amine is added in two steps. The mixture is stirred and heated to a temperature of 160°–190° F. Subsequently, sodium hydroxide is added in two steps to the reaction mixture, with intervening heating and mixing. After completion of the polymerization, the sodium chloride formed in the reaction is removed by filtering and the alcohol solvent is removed by distillation. The product then is formed as a 50% by weight solution in a xylene solvent.

As hereinbefore set forth the above products are blended in a proportion of 95% by weight of $N^1$-$N^3$-di-(1-ethyl-3-methylpentyl)-diethylene triamine and 5% by weight of the polymeric reaction product, exclusive of solvent.

EXAMPLE II

The composition of this example comprises 90% by weight of $N^1$-$N^3$-di-(1-methylheptyl)-diethylene triamine and 10% by weight of the polymeric reaction product of hydrogenated tallow amine and epichlorohydrin.

The $N^1$-$N^3$-di-(1-methylheptyl)-diethylene triamine is prepared by the reductive alkylation of diethylene triamine with methyl hexyl ketone in substantially the same manner as described in Example I.

The polymeric reaction product is prepared in substantially the same manner as described in Example I except that the amine used is hydrogenated tallow amine. It will be noted that the amine used in Example I is a diaminoalkane, whereas the amine in this example is a monoamine. Following completion of the reaction, the polymeric reaction product is prepared as a 50% by weight solution in a heavy xylene solvent.

EXAMPLE III

The inhibitor composition of this example comprises 80% by weight of N,N'-dicyclohexyl-ethylene diamine and 20% by weight of the polymeric reaction product of oleyl amine and epichlorohydrin.

The N,N'-dicyclohexyl-ethylene diamine is prepared by the reductive alkylation of one mole proportion of ethylene diamine with two mole proportions of cyclohexanone in substantially the same manner as described in Example I. The polymeric reaction product is prepared in substantially the same manner as described in Example I except that the amine used in this example is oleyl amine. The polymeric reaction product is prepared as a 50% by weight solution in an aromatic solvent. The substituted ethylene diamine and polymeric reaction product are blended in proportions of 80% by weight of the former and 20% by weight of the latter, exclusive of solvent.

EXAMPLE IV

The corrosion inhibition properties were determined in a corrosion testing apparatus which, in general, entails preparing a mixture of toluene and water containing 0.0056 N ammonium chloride solution. This mixture, together with 1 atmosphere of hydrogen sulfide, is recirculated over 2-mil thick steel probes. The apparatus provides for measuring the electrical current flowing through the probe during the test. While maintaining a constant electrical potential, the current measurement is recorded graphically. The decrease in current is directly proportional to the increase in total corrosion. Accordingly, by determining the rate of change in current, the corrosion rate, expressed as m.p.y. (mils per year), is determined. The corrosion inhibition is expressed as percent protection.

The base current rate, no inhibitor added, averaged approximately 200 m.p.y. When evaluated in the above manner, the inhibitor composition of Example I in a total concentration of 5 p.p.m. (parts per million) active ingredients reduced the corrosion rate down to 0, thus showing 100% protection.

For comparative purposes, 5 p.p.m. of $N^1$-$N^3$-di-(1-ethyl-3-methylpentyl) - diethylene triamine was utilized alone in a concentration of 5 p.p.m. and reduced the corrosion rate down to 10 m.p.y. or 93% protection.

When the polymeric reaction product by itself was utilized in a concentration of 0.15 p.p.m. no reduction in the rate of corrosion was obtained. The polymeric reaction product generally is employed as an inhibitor to reduce sediment formation and not as a corrosion inhibitor.

From the above data, it will be noted that the inhibitor mixture of the present invention served to considerably improve the corrosion inhibition potency of the substituted diethylene triamine. This is surprising because, as mentioned above, the polymeric reaction product in low concentrations is of no effectiveness as a corrosion inhibitor and thus it would not be expected to enhance corrosion inhibition properties. However, as hereinbefore set forth, it is believed that these improved results may be due to the interdependent and coaction of the polymeric reaction product in extracting the substituted alkylene polyamine out of the hydrocarbon phase and into contact with the metal surface, whereby more effective corrosion inhibition is obtained.

These improved results are particularly important from practical concentrations because of the desire to use very small concentrations of inhibitor compounds. In other words, in order to compete economically in the industry, it is important that maximum corrosion inhibition be obtained with very low concentrations of inhibitors.

EXAMPLE V

The inhibitor composition of Example II, in a concentration of 10 p.p.m. of active ingredients, is incorporated in fuel oil being transported via pipeline and serves to retard corrosion of the metal surfaces.

EXAMPLE VI

The inhibitor composition of Example III is incorporated, in a concentration of 7.5 p.p.m. active ingredients, in a kerosine stream being pumped into a storage tank, and serves to inhibit corrosion of the piping and tank equipment.

EXAMPLE VII

The corrosion inhibitor composition of Example I is introduced in a concentration of 6 p.p.m. active ingredients into the overhead line of a crude column and serves to inhibit corrosion of the piping and communicating heat exchangers, coolers, and receivers.

EXAMPLE VIII

The inhibitor composition of Example I is incorporated, in a concentration of 15 p.p.m. active ingredients, in gasoline and serves to inhibit corrosion of the metal parts contacted by the gasoline.

I claim as my invention:
1. A corrosion inhibiting composition of (1) from about 50% to about 98% by weight of an alkylene polyamine having the formula:

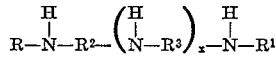

where R and $R^1$ are hydrogen, alkyl of at least 3 carbon atoms or cycloalkyl of at least 3 carbon atoms, at least one of R and $R^1$ being alkyl or cycloalkyl, $R^2$ and $R^3$ are alkylene of 2 to 4 carbon atoms and $x$ is an integer of 0 to 3 and (2) from about 2% to about 50% by weight of the polymeric reaction product formed by reacting, at a temperature of about 65° to about 215° F., substantially equimolar proportions of an epihalohydrin compound and a 10–30 carbon atom aliphatic amine having 1 or 2 amino groups and consisting of carbon, hydrogen and nitrogen, said reaction product having 2 to 20 recurring units.

2. The composition of claim 1 in which the alkylene polyamine is a concentration of from about 90% to about 98% by weight and the polymeric reaction product is in a concentration of from about 2% to about 10% by weight, based upon active ingredients.

3. The composition of claim 1 in which said alkylene polyamine is $N^1$-$N^3$-di-$C_3$-$C_{40}$-alkyl-diethylene triamine.

4. The composition of claim 3 in which said alkylene polyamine is a $C_6$-$C_{20}$-sec-alkyl-diethylene triamine.

5. The composition of claim 1 in which said alkylene polyamine is an $N^1$-$N^3$-di-cycloalkyl-diethylene triamine.

6. The composition of claim 1 in which said aliphatic amine is a mixture of fatty amines containing aliphatic groups within the range of from about 10 to about 24 carbon atoms per molecule.

7. The composition of claim 6 in which said fatty amine is hydrogenated tallow amine.

8. The mixture of claim 1 in which said aliphatic amine is N-tallow-1,3-diaminopropane.

9. The mixture of claim 1 in which said epihalohydrin compound is epichlorohydrin.

10. A method of inhibiting corrosion of metallic surfaces which contact a substrate containing corrosive materials, which comprises incorporated therein a corrosion inhibiting concentration of the composition of claim 1.

11. The substrate of claim 10 being hydrocarbon distillate.

12. The substrate of claim 10 being an overhead stream in a hydrocarbon refining process.

References Cited

UNITED STATES PATENTS

| | | | |
|---|---|---|---|
| 3,063,790 | 11/1962 | Pollitzer | 21—2.7 R |
| 3,189,652 | 6/1965 | Pollitzer | 44—72 |
| 3,114,702 | 12/1963 | Thompson | 21—2.7 R |
| 3,696,049 | 10/1972 | Hausler et al. | 252—390 |
| 3,705,109 | 12/1972 | Hausler et al. | 252—392 |

FOREIGN PATENTS

| | | | |
|---|---|---|---|
| 593,538 | 3/1960 | Canada | 252—390 |

LEON D. ROSDOL, Primary Examiner

IRWIN GLUCK, Assistant Examiner

U.S. Cl. X.R.

21—2.5 R, 2.7 R; 203—7; 208—47, 348; 252—8.55 E, 148, 390